Oct. 31, 1961  T. W. KENYON ET AL  3,006,197
STABILIZING INSTRUMENT
Filed Jan. 18, 1960  4 Sheets-Sheet 4
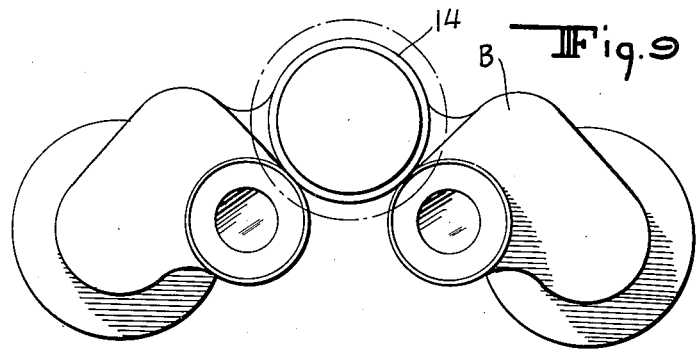
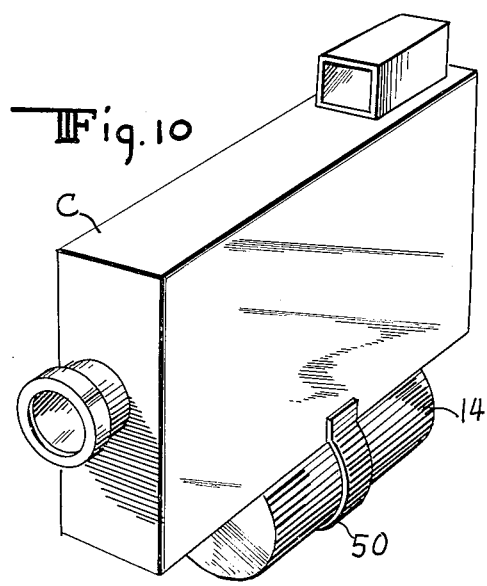
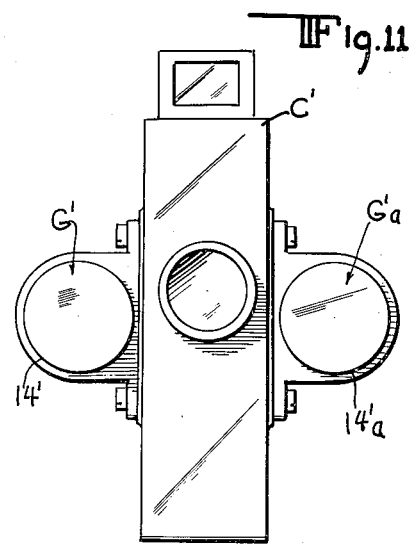
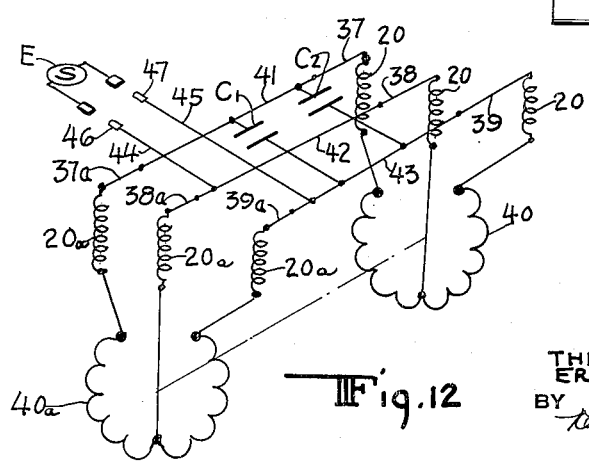
INVENTORS
THEODORE W. KENYON
ERNEST H. PALLME
BY
*Kenyon & Kenyon*
ATTORNEYS

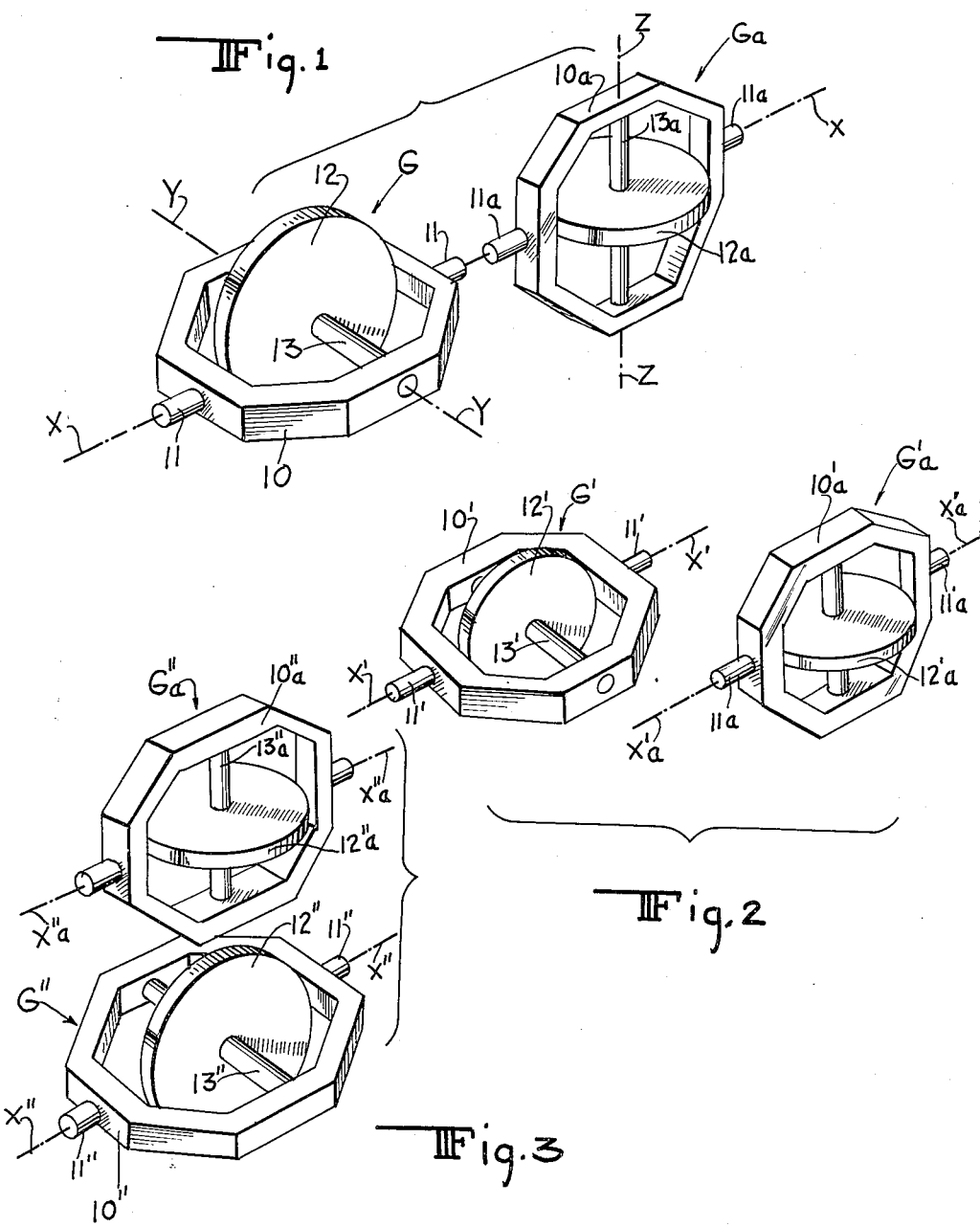

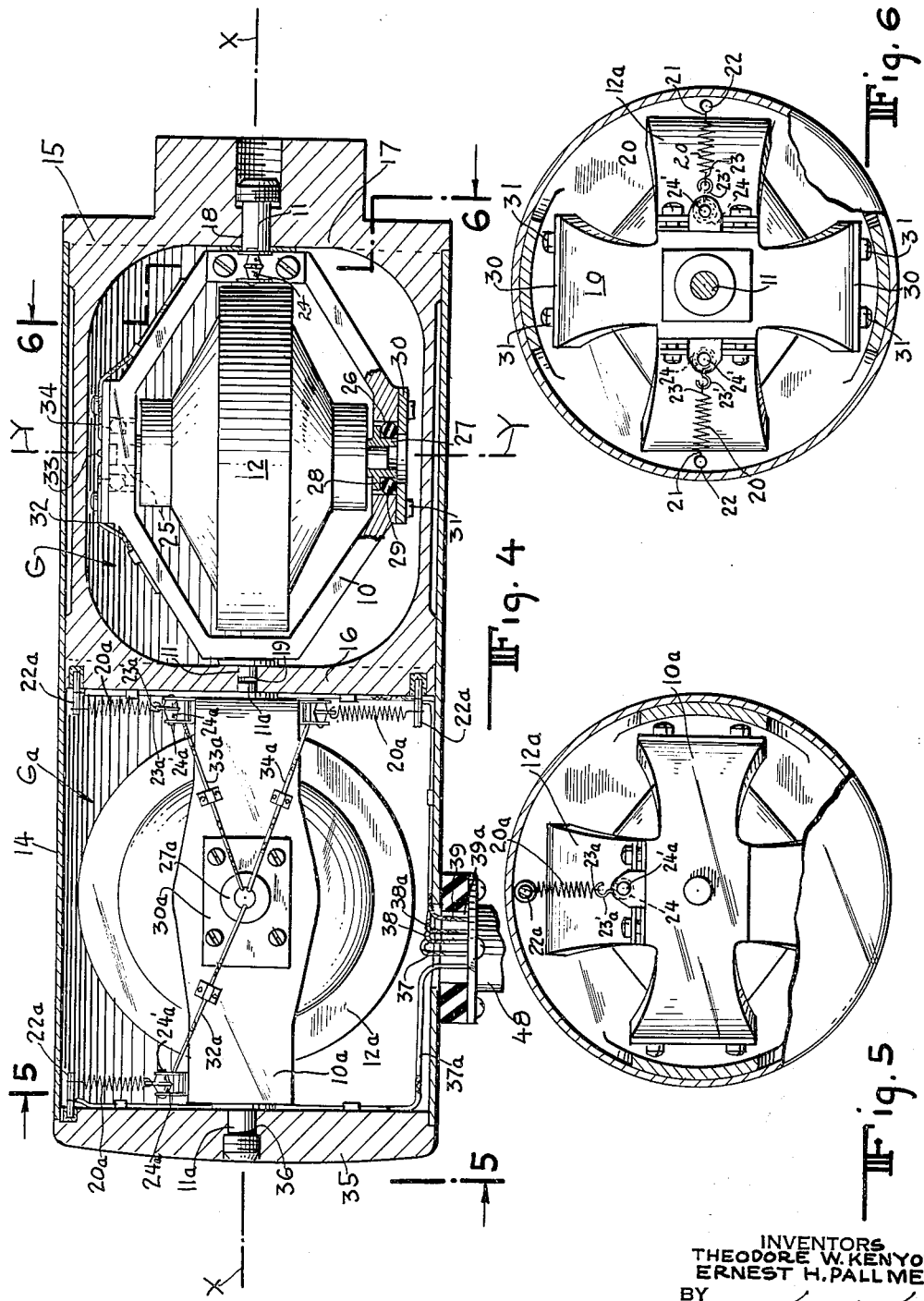

3,006,197
STABILIZING INSTRUMENT

Theodore W. Kenyon and Ernest H. Pallme, Old Lyme, Conn., assignors to Kenyon Laboratories, Inc., Deep River, Conn., a corporation of Connecticut
Filed Jan. 18, 1960, Ser. No. 2,924
3 Claims. (Cl. 74—5.22)

This invention relates to gyroscopic stabilizing instruments intended primarily for use with sighting devices such as binoculars, cameras or the like.

In use of sighting devices of the character mentioned, it is frequently very difficult to secure sharp images of objects that are under observation or that are being photographed because of vibration. This vibration may be caused by hand tremors or by movement of a vehicle carrying the observer or the result of other environmental factors. Whatever the cause, they blur the image of the observed object sufficiently to make it hazy or else destroy its clarity completely. When high magnification is also present, it emphasizes these undesirable effects of vibrations.

In the past gyroscopic stabilizing instruments have been utilized in conjunction with sighting devices in an attempt to eliminate the difficulties caused by vibrations. The present invention contemplates substantial improvements over known devices both in simplification of their structure and in space saving features.

We have discovered that material structural simplification and material saving of space and miniaturization of the instrument can be achieved by providing a coaxial or parallel arrangement of the gimbals of the gyro wheels, while their spin axes are disposed in crossed relationship. When this arrangement is utilized, the overall diameter of the instrument may be appreciably smaller for the same resultant stabilizing effect than in one wherein the gimbal axes are oriented in crossed relationship as for example in Kenyon Patent No. 2,811,042. The present arrangement thus permits use of a stabilizing instrument in many applications where, because of its larger size, instruments like that of said patent cannot conveniently be used.

Objects and features of this invention are the provision of stabilizing instruments utilizing crossed rotor axes with aligned or parallelly disposed gimbal axes, resulting in space saving and structural simplification over instruments presently extant.

Other objects and features of the invention are the provision of means for elimination of vibrations of rotor rotation.

Further objects and features of the invention are the provision of instruments of great structural simplicity that are easy to assemble and to use.

Other objects and features of the invention will become apparent from the following specification and the accompanying drawings forming a part hereof, wherein:

FIGURE 1 is a perspective and partially diagrammatic view of an arrangement of two like gyros as utilized in practicing the invention and showing coaxial relationship of the gimbal axes and crossed relationship of the rotor axes;

FIGURE 2 is a similar view wherein the gimbal axes are parallelly disposed in a horizontal plane;

FIGURE 3 is a similar view wherein the gimbal axes are parallelly disposed in a vertical plane;

FIGURE 4 is a longitudinal sectional view of a working embodiment of the invention wherein the gimbal axes are coaxially disposed;

FIGURE 5 is a section taken along the plane of line 5—5 of FIGURE 4 and viewed in the direction of the arrows;

FIGURE 6 is a section taken along the plane of line 6—6 of FIGURE 4 viewed in the direction of the arrows;

FIGURE 9 is an end elevation view from the left of FIGURE 8;

FIGURE 10 is a perspective view of a camera equipped with the device of this invention;

FIGURE 11 is an end elevation of a camera equipped with the device of this invention wherein the gimbal axes of the two gyros are parallelly disposed in a horizontal plane; and FIGURE 12 is a diagrammatic showing of an electric circuit utilized for operating the two gyros of the stabilizing device.

Figure 7:
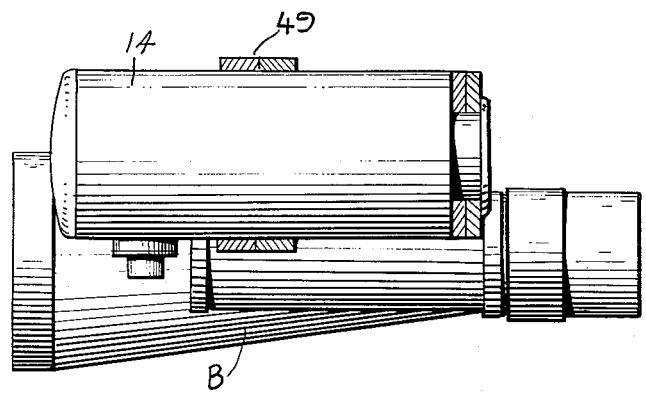
FIGURE 7 is a side elevational view of the device of this invention as applied to binoculars.

Referring to the drawing and first to FIGURE 1, two gyros G and Ga of identical construction are provided. As these gyros are identical in construction, the component parts of gyro G alone are described in detail, it being understood that those identical components of gyro Ga are designated by identical reference characters with the added subscript $a$.

Gyro G comprises a gimbal or gyro frame 10, provided with axially aligned trunnions 11 extending from opposite sides of the gimbal 10 along a central axis X—X. A gyro rotor or wheel 12 is supported for rotation in the gimbal 10 by the rotor shaft or axle 13 whose axis Y—Y is perpendicular to the axis X—X of the trunnions. The gyro gimbal 10a of the gyro Ga is provided with trunnions 11a which are disposed coaxially with trunnions 11 of gimbal 10. The rotor 12a of gyro Ga has its shaft or axle 13a supported by the gimbal 10a along an axis Z—Z which may be perpendicular to the axis Y—Y of axle 13. The two rotors 12 and 12a therefore are in crossed relationship to each other while the gimbal trunnions 11 and 11a are coaxial along axis X—X.

In FIGURE 2 the two gyros G' and G'a and their components are identical with their respective counterparts in FIGURE 1 except that the trunnions 11' and 11'a instead of being coaxial are disposed in parallelism along axes X'—X' and X'a—X'a in a horizontal plane. The rotor spindles 13' and 13'a are in crossed relationship along respective axes Y'—Y' and Z'—Z' as in the embodiment of FIGURE 1.

In FIGURE 3, the two gyros G" and G"a and their components are identical with their respective counterparts in FIGURE 1 except that the trunnions 11" and 11"a instead of being coaxial are disposed in parallelism along axes X"—X"a in a vertical plane. The rotor spindles 13" and 13"a are in crossed relationship along respective axes Y"—Y" and Z"—Z" as in the embodiment of FIGURE 1.

In one practical embodiment of the invention as shown in FIGURE 4 which conforms substantially with the diagrammatic arrangement of FIGURE 1, a tubular casing 14 is utilized to serve as a housing for the two gyros G and Ga. A skeletal frame 15 is inserted into the casing 14 from one of its ends. This frame includes a pair of spaced parallel cross members 16 and 17 provided respectively with the axially aligned bearings 18 and 19 which lie coincident with the longitudinal axis X—X of the casing 14. The oppositely extending trunnions 11 of the gimbal 10 are mounted for free rotation in the respective bearings 18 and 19. Restraining means or spring restraints for the gimbal 10 in the form of electrically conductive light springs 20 are provided. Each spring 20 is attached at one end 21 to a fixed pin 22 insulatively supported by the frame 15. The opposite end 23 of each spring 20 is hooked under tension to a hooklike link 23' mounted on a freely rotatable roller 24 borne by a cross pin 24' insulatively carried in turn by the gimbal 10. These springs 20 thus act both as electrical conductors and as spring restraints for the gimbal 10 tending normally to bias it towards its normally undeflected position which is that wherein the central plane of gimbal 10 is in substantially vertical position of FIGURE 4.

Oppositely disposed axially aligned openings 25 and 26 are provided in wall of the gimbal 10, these holes lying in the Y—Y axis of FIGURE 4. Bushings 27 are mounted in these holes 25 and 26 and serve as bearings for the opposite ends of the rotor axle 13. Each bushing 27 has a lateral annular flange 28 and a resilient O-ring 29 of rubber or the like is fitted on each bushing so as to rest on its flange 28. The O-rings are compressed against these flanges by retaining plates 30 which are fastened to the gimbal 10 as by bolts 31. The bushings 27 thus are in effect cushioned by the compressed O-rings 29 and thus provide means for isolating vibration of the rotors 12 during their rotation thus reducing the detrimental effects of shock or rotor wheel vibration during operation of the stabilizer. The electrical leads 32, 33, 34 to the rotor windings connected to the respective pins 24 and are introduced for connection to the rotor via the hole 25 and the hollow axle 13 of rotor 12 for energizing the latter as will be described.

The gyro Ga is supported within the casing 14 alongside the gyro G. To this end an end plate 35 is fitted into the casing 14. This end plate has a bearing 36 aligned axially with bearing 19. The oppositely extending trunnions 11a of gimbal 10a are mounted in the respective bearings 36 and 19 so that the rotational axis of gimbal 10a is coaxial with that of gimbal 10 along axis X—X. The restraining springs 20a have their opposite ends secured respectively to fixed pins 22a disposed in the end plate 35 and the frame 15 and the cross pins 24a. These restraining springs 20a function in the same manner as the springs 20 for imparting spring restraint to the gimbal 10a tending normally to maintain its plane in substantially horizontal position as shown in FIGURES 4 and 5.

The rotor axle 13a of rotor 12a is supported by gimbal 10a in the same way as rotor axle 13 is supported by gimbal 10. Thus the two rotor axles 13 and 13a lie in crossed relationship to each other at all times. The power leads 32a, 33a, 34a for the rotor 12a are connected to pins 24a and are led to the rotor windings of rotor 12a in the same way as leads 32, 33 and 34.

The same vibration cushioning support of rotor axle 13a is provided as that for rotor axle 13.

The various insulatively supported pins 22, 22a are all independently connected by appropriate lead wires 37, 37a, 38, 38a, 39, 39a and pass outwardly of casing 14 via an opening 38 for connection to an energizing source as will be described.

The assembled unit within the casing 14 is adapted to have its rotors 12 and 12a energized electrically as seen in FIGURE 12. For example, the field windings 40 and 40a of the two gyros G and Ga are connected in electrical parallel by the three interconnecting wires 41, 42 and 43 through the various springs 20. The condensers $C_1$ and $C_2$ are connected across the wires 41 and 43. Input wires 44 and 45 are connected to the wires 41 and 42 and to terminal prongs 46 and 47 conveniently supported in a socket 48 carried by casing 14. These two prongs are readily connectable in conventional ways to a suitable source E of electric power, in this embodiment, 115 volt, 400 cycle A.C. Power of other frequency and voltage may be supplied depending upon the ratings of the two gyros G and Ga. Other known ways of driving the rotors 12 and 12a may be used if desired. The condensers $C_1$ and $C_2$ are conveniently mounted in any desired way within the casing 14.

Figure 8:
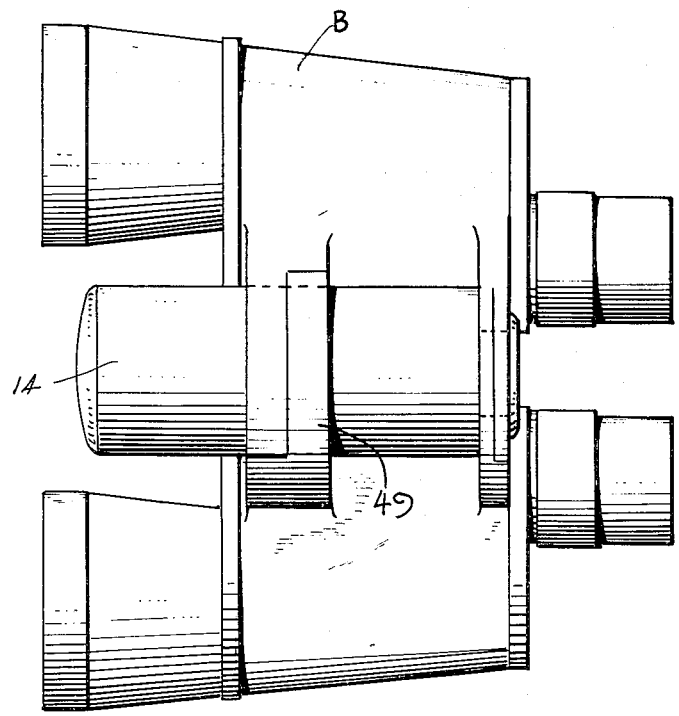
FIGURE 8 is a plan view of the same device as applied to binoculars.

Any suitable arrangement may be provided for suspending the assembly within casing 14 from a sighting device such as binoculars B, FIGURES 7-9 or a camera C, FIGURE 10. In either event the suspension of the casing 14 is such that the longitudinal axis X—X of said casing lies parallel with the sighting axes either of the binoculars B and/or camera C. This suspension may be effected by a clamp 49 designed to maintain casing 14 parallel with the fore and aft direction of binoculars B or by a similar clamp 50, FIGURE 10. With such suspension the axes Y—Y and Z—Z of the respective rotors are disposed in crossed relationship in normally vertical and transverse horizontal axes while the gimbal axes of the two gyros lie aligned along the axis X—X of the casing 14.

In a modified construction as seen in FIGURE 11, the two gyros G' and G'a are mounted in separate casings 14' and 14'a which are respectively supported by separate clamps 51 and 52 from the camera C' so that the gimbal axes of the respective gyros G' and G'a are disposed in parallelism as illustrated in FIGURE 2 while the two rotors are in crossed relationship as illustrated in FIGURE 2.

Operation of the stabilizing instruments when attached either to binoculars B or to a camera C so that the casing 14 lies parallel with the sighting line of either is substantially the same. Then the gimbal axes either coincide in FIGURES 7-9 and 10 or are parallelly disposed, FIGURE 11, while the rotor axes are in crossed relationship.

When power is supplied to rotate the gyro rotors, both, because of the angular disposition of their rotor axes, contribute stabilizing action to each axis of stabilization, e.g., the horizontal and vertical axes. This stabilization is effective against hand tremors or other vibrations and tends to maintain the binoculars B or camera C in a steady state on the line of sight during use and tends to resist positional change tendencies caused by tremors, vibrations or other unsteadiness. The object viewed or photographed therefore is sharp and is neither blurred nor hazy. This effect likewise occurs in the arrangement of FIGURES 2 and 11 and may be similarly procured in a system such as that disclosed in FIGURE 3.

While specific embodiments of the invention have been described, variations in structural detail within the scope of the appended claims are possible and are contemplated. There is no intention therefore of limitation to the exact disclosure hereinabove presented.

What is claimed is:

1. Apparatus for use with sighting devices comprising a casing, frame means within the casing having axially aligned bearings, a gimbal having oppositely extending aligned trunnions mounted for free rotation in said bearings on the longitudinal axis of said casing, said gimbal having oppositely disposed axially aligned openings perpendicular to the longitudinal axis of said casing, bushings mounted in said openings, resilient cushioning means for said bushings, a rotor having an axle supported by said bushings, a second gimbal having oppositely extending aligned trunnions mounted for free rotation in said bearings on the longitudinal axis of said casing, said second gimbal having oppositely disposed, axially aligned openings perpendicular to the longitudinal axis of said casing and also perpendicular to the first-named axially aligned openings, bushings mounted in said second-named openings, resilient cushioning means for said last-named bushings, and a second rotor having an axle supported by said second-named bushings so as to be crossed at substantially 90° with said first-named axle while the trunnions of said gimbals lie axially aligned.

2. Apparatus for use with sighting devices comprising a casing, frame means within said casing including a pair of spaced parallel cross members, said members having axially aligned bearings coaxial with the longitudinal axis of said casing, a gimbal having oppositely extending, aligned trunnions mounted for free rotation in said bearings on said longitudinal axis, said gimbal having oppositely disposed axially aligned openings perpendicular to said longitudinal axis, bushings mounted in said openings, resilient cushioning means for said bushings, a rotor having an axle supported by said bushings, a member having a bearing aligned axially with said first-named bearings, a second gimbal having oppositely extending trunnions mounted for free rotation between said last and first-named bearings on said longitudinal axis, said second gimbal having oppositely disposed, axially aligned openings perpendicular to said axis and also perpendicular to said first-named openings, bushings mounted in second-named openings, resilient cushioning means for said last-named bushings, a second rotor having an axle supported by said second-named bushings so as to lie crossed at substantially 90° with said first-named axle while the trunnions of said gimbals lie axially aligned, and spring restraint means for the respective gimbals.

3. Apparatus for use with sighting devices comprising a casing, frame means within the casing having bearings, a gimbal having oppositely extending aligned trunnions mounted for free rotation in said bearings, said gimbal having oppositely disposed openings, bushings mounted in said openings, resilient cushioning means for said bushings, a rotor having an axle supported by said bushings, additional bearings in said frame, a second gimbal having oppositely extending aligned trunnions mounted for free rotation in said additional bearings, said second gimbal having oppositely disposed openings, bushings mounted in said second-named openings, resilient cushioning means for said last-named bushings, a second rotor having an axle supported by said second-named bushings and spring restraint means for the respective gimbals.

References Cited in the file of this patent

UNITED STATES PATENTS

| | | |
|---|---|---|
| 2,395,250 | Carlson | Feb. 19, 1946 |
| 2,771,779 | Schaffer et al. | Nov. 27, 1956 |
| 2,811,042 | Kenyon | Oct. 29, 1957 |

FOREIGN PATENTS

| | | |
|---|---|---|
| 670,021 | Germany | Jan. 10, 1939 |
| 810,279 | Great Britain | Mar. 11, 1959 |
| 820,480 | Great Britain | Sept. 23, 1959 |